United States Patent [19]
Berstis et al.

[11] Patent Number: 5,909,215
[45] Date of Patent: Jun. 1, 1999

[54] METHOD AND APPARATUS TO INTERCEPT AND PROCESS ERROR MESSAGES IN A DATA PROCESSING SYSTEM

[75] Inventors: Viktors Berstis, Austin; Manish Mahesh Modh, Round Rock, both of Tex.

[73] Assignee: International Business Machines Corporation, Armonk, N.Y.

[21] Appl. No.: 08/797,903

[22] Filed: Feb. 10, 1997

[51] Int. Cl.[6] .................................................. G06F 11/00
[52] U.S. Cl. ........................................................ 345/340
[58] Field of Search ................................... 345/340, 335, 345/346, 347, 339, 326, 333, 336, 338, 337, 975, 966; 395/185.01, 185.02, 185.1

[56] References Cited

U.S. PATENT DOCUMENTS

| | | | |
|---|---|---|---|
| 5,121,475 | 6/1992 | Child et al. .............................. | 707/507 |
| 5,212,692 | 5/1993 | Itoh ......................................... | 371/5.1 |
| 5,276,801 | 1/1994 | Heyen et al. ............................ | 345/501 |
| 5,388,251 | 2/1995 | Makino et al. ....................... | 395/185.1 |
| 5,392,386 | 2/1995 | Chalas ...................................... | 345/335 |
| 5,475,843 | 12/1995 | Halviatti et al. ......................... | 395/704 |
| 5,535,422 | 7/1996 | Chiang et al. .......................... | 345/338 |
| 5,631,847 | 5/1997 | Kikinis ............................... | 395/200.37 |
| 5,673,390 | 9/1997 | Mueller ................................ | 395/185.1 |

*Primary Examiner*—Matthew M. Kim
*Assistant Examiner*—Crescelle N. dela Torre
*Attorney, Agent, or Firm*—Jeffrey S. LaBaw

[57] ABSTRACT

A process in a data processing system for handling messages received in a message queue in a message handling process for a graphical user interface. In response to receiving a message in the queue, a determination is made as to whether the error is a message. In response to an identification of an error message, that message is intercepted before processing by the message handling process. A determination is made as to whether a corrective action is required in response to the error message and as to whether the error message should be reformatted. If corrective action is required, that action is initiated by the process. Additionally, if the message should be reformatted, the process then reformats the message and returns the message to the message handling process for further processing.

21 Claims, 12 Drawing Sheets

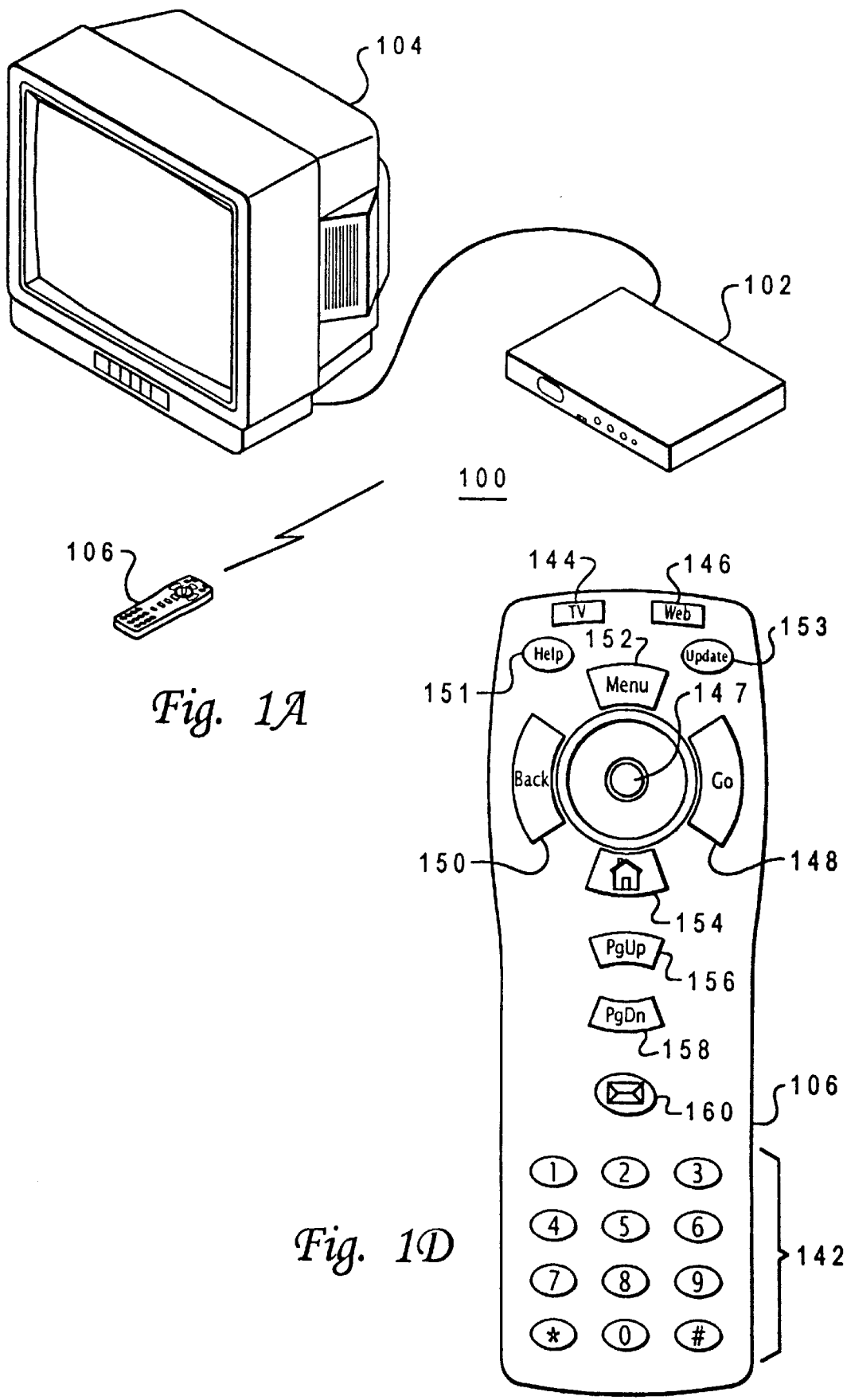

| ERROR MESSAGE 800 | REFORMATTING 802 | CORRECTIVE ACTION 804 | RESPONSE 805 |
|---|---|---|---|
| MESSAGE A | NONE | NONE 806 | PUSH OK BUTTON |
| MESSAGE B | MESSAGE X | RESTART 808 | PUSH OK BUTTON |
| MESSAGE C | MESSAGE Y | REBOOT 810 | NONE |
| MESSAGE D | MESSAGE Z | COM LINK 812 | NONE |
FIG. 9
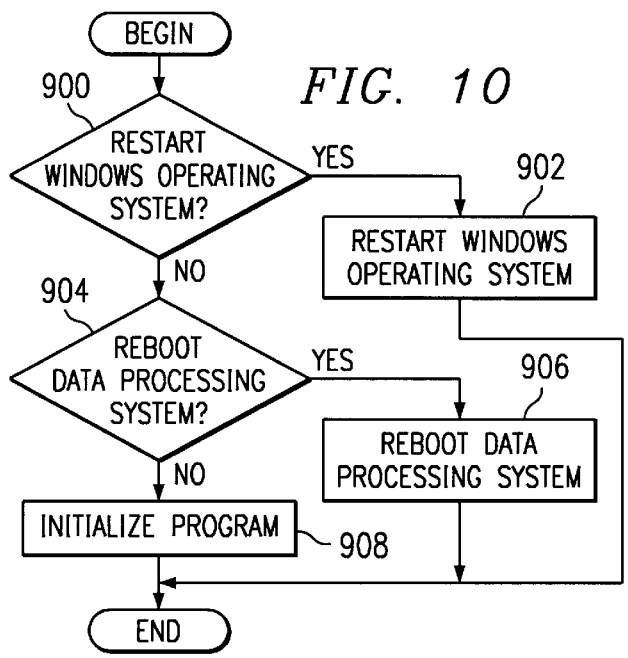
FIG. 10
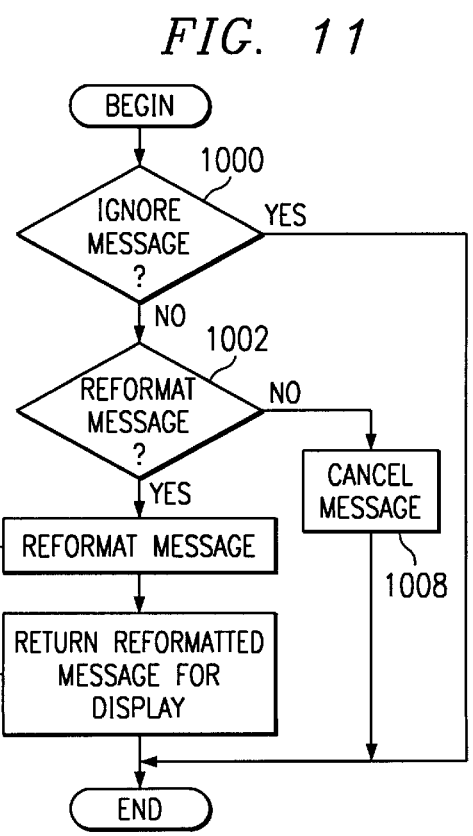
FIG. 11
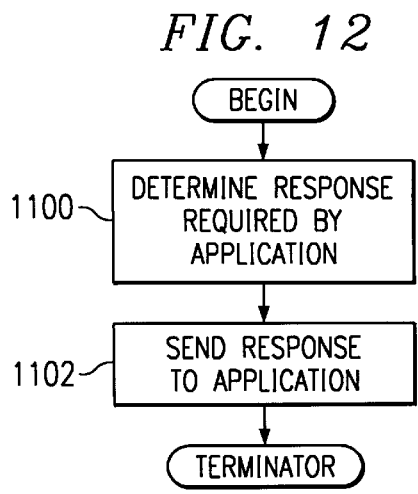
FIG. 12

METHOD AND APPARATUS TO INTERCEPT AND PROCESS ERROR MESSAGES IN A DATA PROCESSING SYSTEM

BACKGROUND OF THE INVENTION

1. Technical Field

The present invention relates generally to an improved data processing system and in particular to an improved graphical user interface in a data processing system. Still more particularly, the present invention relates to an improved method and apparatus for handling error messages in a graphical user interface in a data processing system.

2. Description of the Related Art

The manipulation of data in a data processing system is well known in the prior art. Data may be manipulated in many ways in a modern data processing system including: data accessing, data encoding, data communications, data compression, data conversion, data entry, data exchange, data filing, data linking, data locking, data manipulation, data mapping, data processing, data recording, data sorting, and data transferring. The large amounts of data which are available to the user of a modern data processing system often becomes overwhelming in magnitude and complexity.

As a result of the increasing complexity of data processing systems, attempts have been made to simplify the interface between a user and the large amounts of data present within a modern data processing system. One example of an attempt to simplify the interface between a user and a data processing system is the use of a graphical user interface (GUI) to provide and intuitive and graphical interface between the user and the data processing system. Data is presented to a user in a number of different windows that may be arranged in various ways depending on the user's manipulations of the windows. This type of display format enables a user to choose commands, start programs and see lists of files and other options by pointing to pictorial representations, also called "graphical objects" on the screen. Choices can be generally activated with the keyboard or a pointing device, such as a mouse. A pointing device is a device used to point to or graphically indicate graphical objects displayed within the GUI of a data processing system and includes, but is not limited to: a mouse, track ball, touch pad, light pen, touch screen, and the like. A pointing device is typically employed by the user of a data processing system to interact with the data processing system's GUI. A "pointer" is an iconic image controlled by a mouse or other such device and is displayed on the video display device of a data processing system to visually indicate to the user icons, menus, or the like that may be selected or manipulated.

In a GUI, error messages are often displayed to a user in a type of window called a message box. With presently available GUIs, these messages are often cryptic and do not provide many users within information that may be used to determine the next appropriate step. In many cases, the displayed error message is entirely useless to the user. Therefore, it would be advantageous to have improved method and apparatus for handling these types of error messages.

SUMMARY OF THE INVENTION

It is one object of the present invention to provide an approved data processing system.

It is another object of the present invention to provide an improved graphical user interface in a data processing system.

It is yet another object of the present invention to provide an improved method and apparatus for handling error messages in a graphical user interface in a data processing system.

The foregoing objectives are achieved as follows.

The present invention provides a process in a data processing system for handling messages received in a message queue in a message handling process for a graphical user interface. In response to receiving a message in the queue, a determination is made as to whether the message will generate a user visible error message. In response to an identification of an error message, that message is intercepted before processing by the message handling process. A determination is made as to whether a corrective action is required in response to the error message and as to whether the error message should be reformatted. If corrective action is required, that action is initiated by the process. Additionally, if the message should be reformatted, the process then reformats the message and returns the message to the message handling process for further processing.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1A–1D are pictorial representations of a data processing system in which the present invention may be implemented;

FIG. 9 is a diagram of a database used for looking up error messages according to the present invention;

FIG. 10 is a flowchart of a process for taking corrective actions in response to receiving an error message according to the present invention;

FIG. 11 is a flowchart of a process for handling error messages displayed to the user according to the present invention; and FIG. 12 is a flowchart of a process for returning a response to an application originating an error message according to the present invention.

DETAILED DESCRIPTION OF THE PREFERRED EMBODIMENT

Figure 1B:
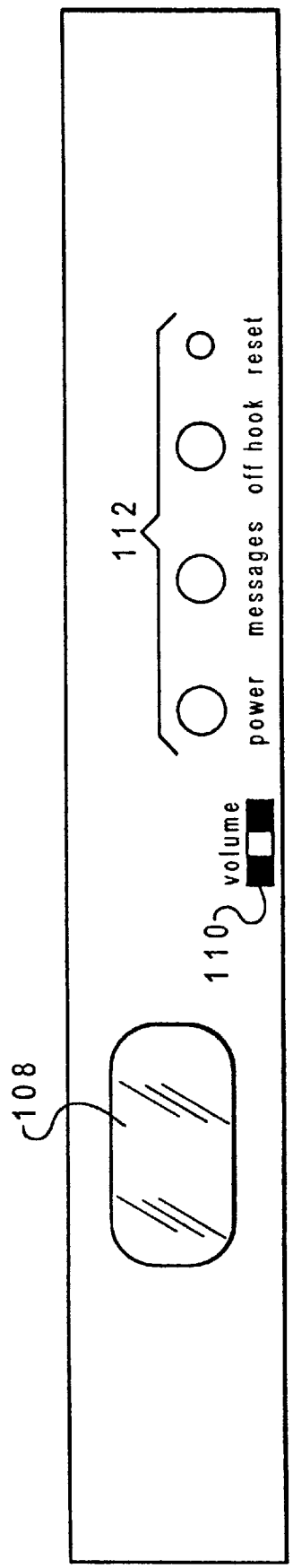

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
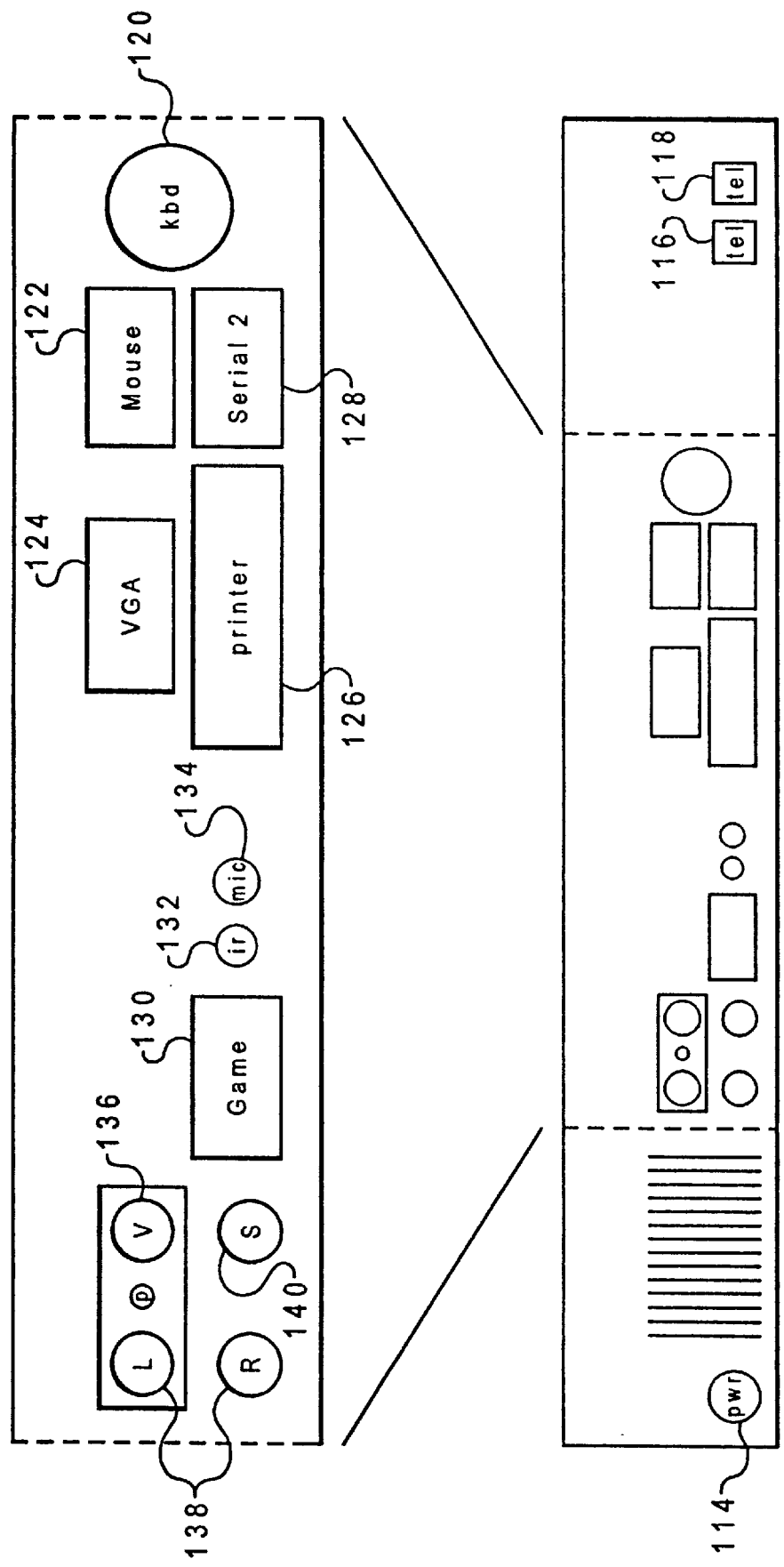

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel ¾ modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
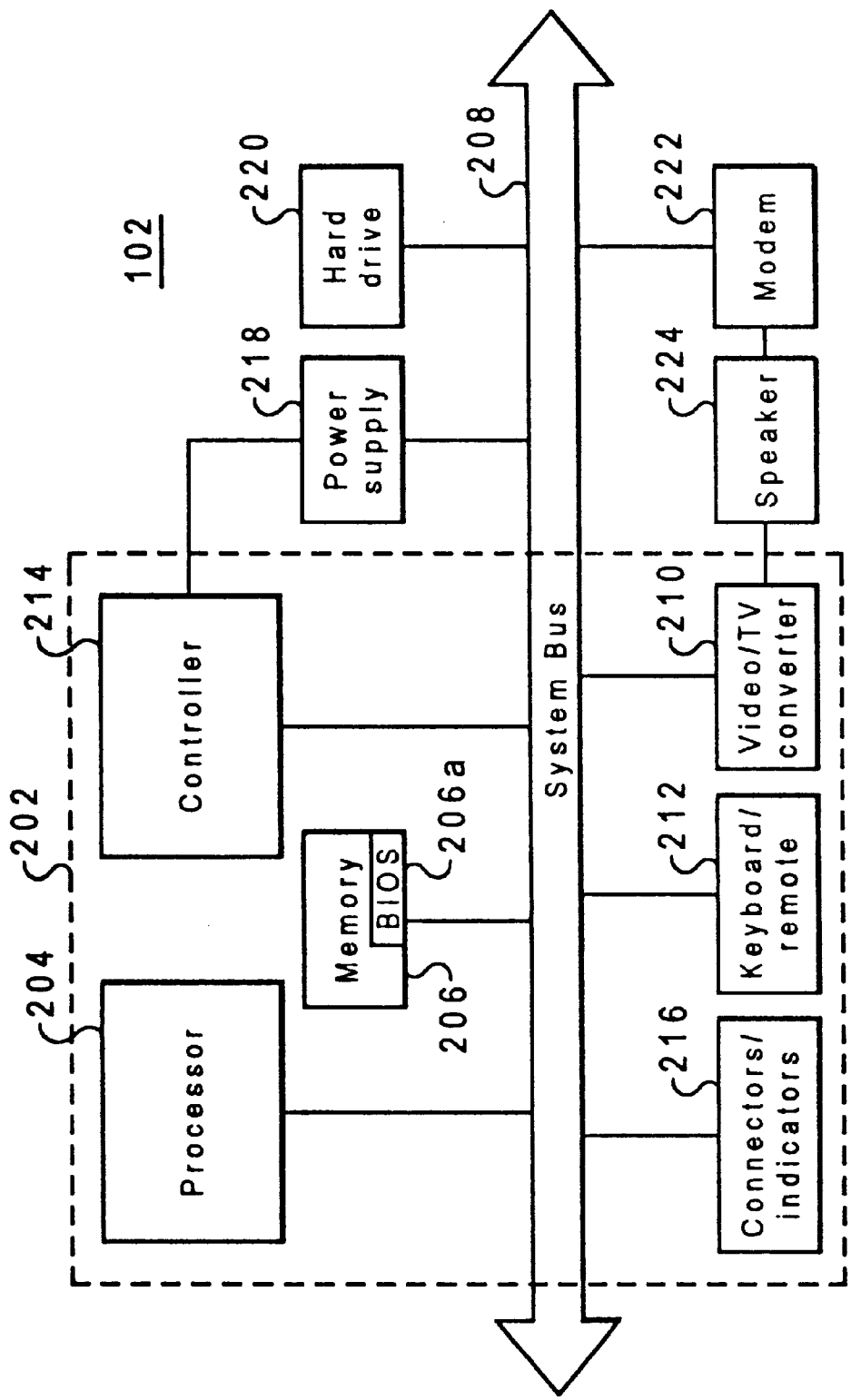
FIG. 2 is a block diagram of the data processing depicted in FIGS. 1A–1D according to the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 204 is preferably at least a 486 processor operating at or above 100 MHz. Memory 206 includes read only memory (ROM) 206*a* containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product of Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1-5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shut off data processing unit 102 and signals that service is required through indicators 216. Thus data processing unit 102 is capable of self-recovery without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1 A–1D and 2 and described above may be varied for specific applications or embodiments. Such variations in which the present invention may be implemented are considered to be within the spirit and scope of the present invention.

Figure 3A:
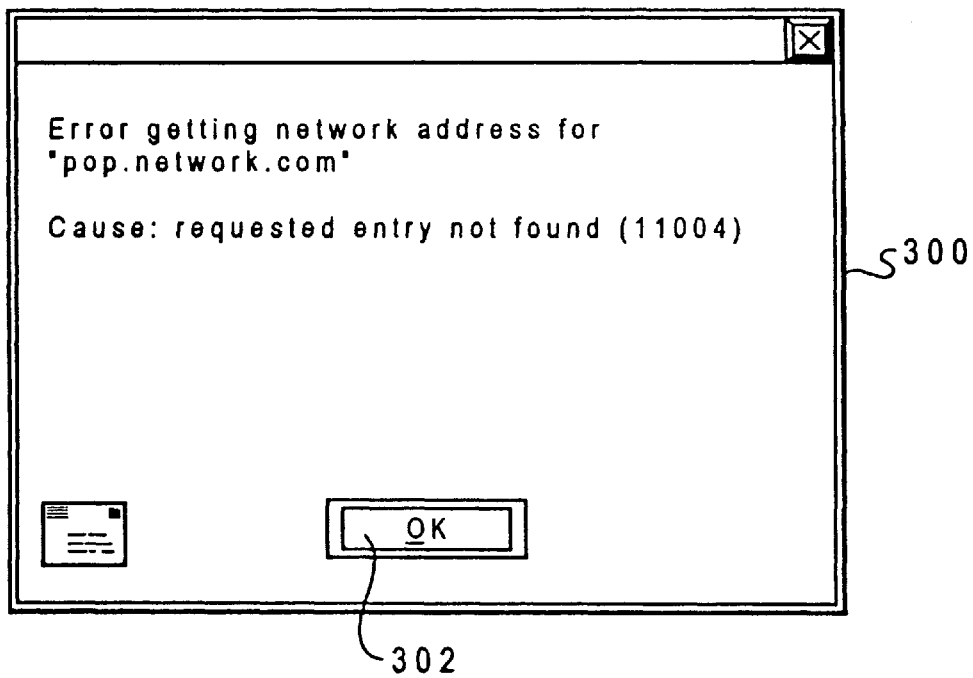
FIGS. 3A–3C are illustrations of error messages.

With reference now to FIG. 3A, an illustration of a presently typical message displayed to a user is depicted. As can be seen, window 300 is a message box that displays an error message associated with an e-mail program in response to the e-mail program being unable to reach the e-mail service. In the depicted example, window 300 states: "Error getting network address for 'pop.network.com'Cause: requested entry not found (11004)". Window 300 also includes an "OK" button 302, which may be depressed using a pointing device to cause message box 300 to be removed from the display screen. In this depicted example, for unsophisticated or new users, the message provides no useful information and does not suggest any course of action.

Figure 3B:
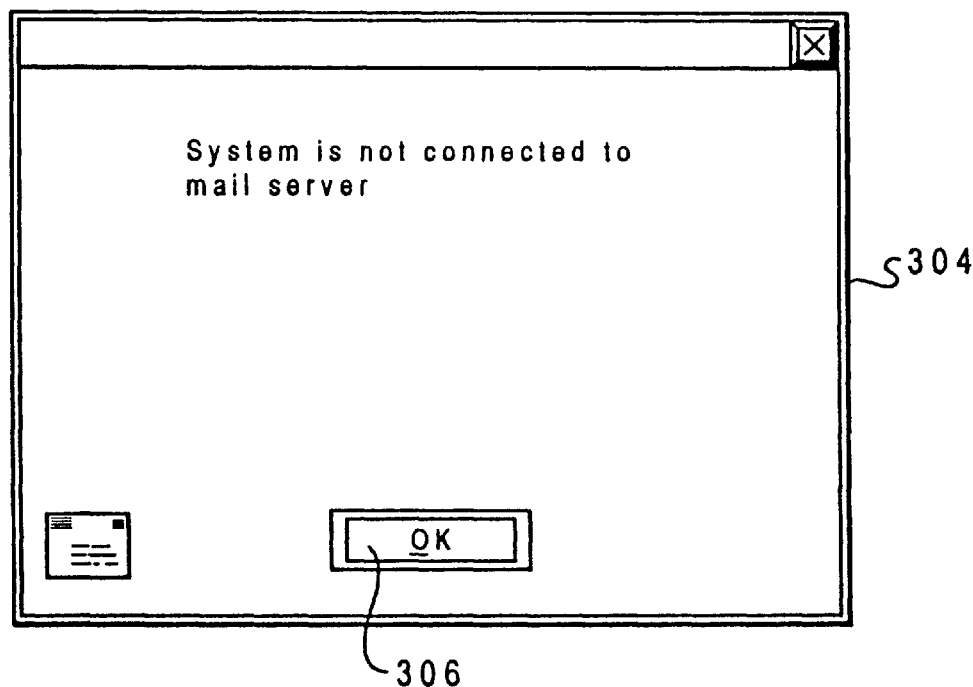

In this situation, a connection has not been established to the provider from which the user obtains e-mail service. According to the present invention, a message such as that displayed in window 300 would be intercepted and replaced with a message such as that shown in window 304 in FIG. 3B. In this case, the window states: "System is not connected to mail server" and provides an "OK" button 306 for the user to depress using a pointing device once the user has noticed and read the message. This message provides much more useful information to the user and tells the user that the data processing system is not connected to the e-mail server. In this case, the user can check to see if the modem has dialed up the service provider. In this case, the message, such as that displayed in window 300 is never shown to the user. Instead, the more useful message in window 304 is shown to the user.

Figure 3C:
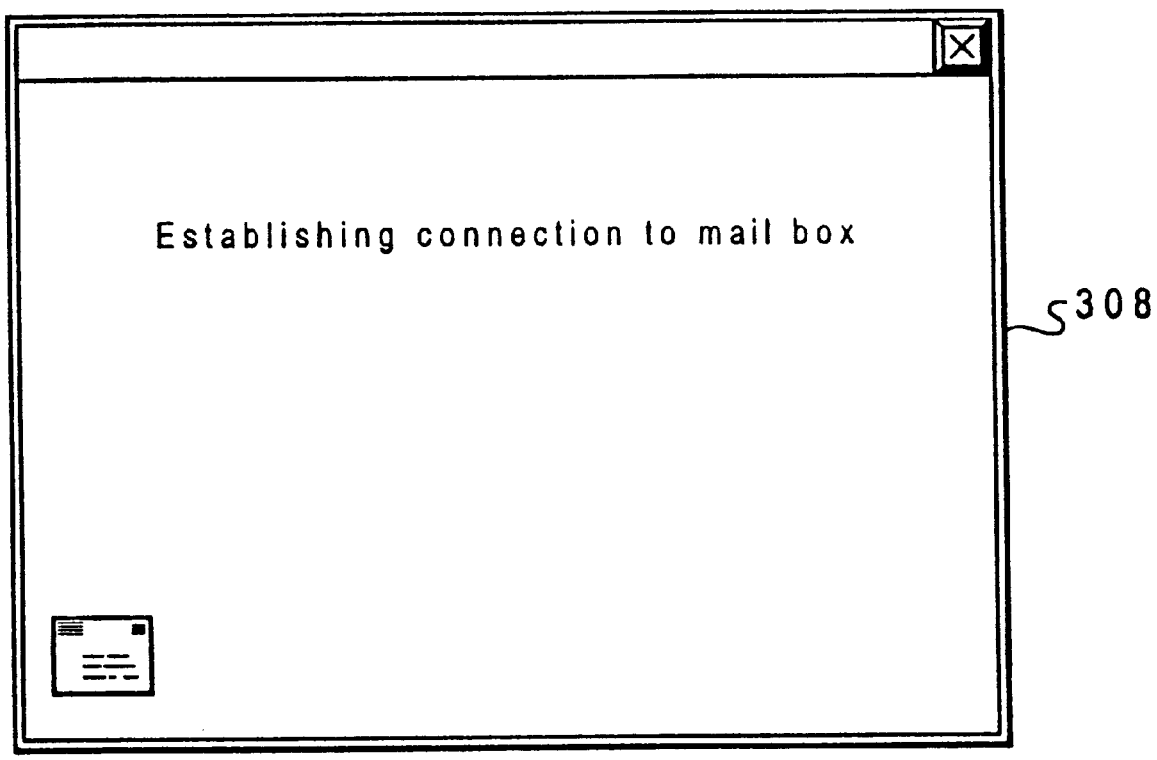

Alternatively, depending on the data processing system, if the error message illustrated in window 300 occurs, the process of the present invention can automatically take corrective action and automatically establish a connection to the user's mailbox by re-establishing a connection to the e-mail provider. For example, window 308 in FIG. 3C states: "Establishing connection to mailbox". No "OK" button is provided because no action need be taken by the user in this case. The present invention initiates actions needed to establish a connection with the e-mail server.

Figure 4:
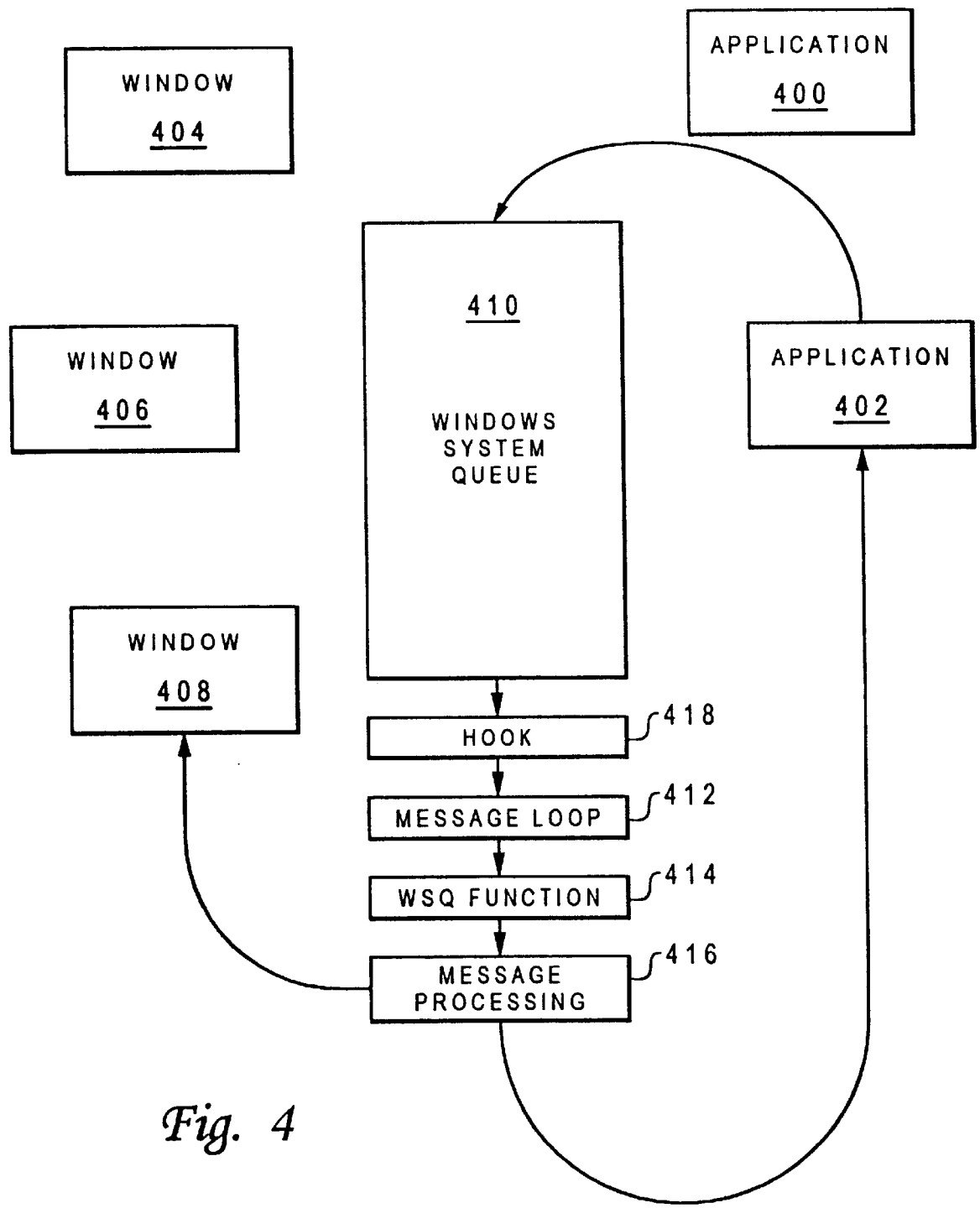
FIG. 4 is a block diagram of software components for a graphical user interface in a data processing system according to the present invention.

With reference now to FIG. 4, a block diagram of software components in a data processing system is depicted according to the present invention. Applications 400 and 402 are currently executing within data processing system 100. Windows 404, 406, and 408 are currently displayed on a display device to a user. Windows 404, 406, and 408 may be windows containing graphical objects, lists of data, or may be message boxes for error messages. Windows system queue (WSQ) 410 receives messages from applications, such as application 402. The received messages are placed in WSQ 410 and processed in a first-in, first-out basis. Message loop 412 fetches messages from window system queue 410 and can provide control to other programs if no messages are present to process. After the message is obtained by message loop 412, the message is translated and then dispatched to WSQ function 414. WSQ function 414 contains the program's logic used in responding to messages received by windows system queue 410. Typically, WSQ function 414 handles message involving messages from menu items, mouse movements, or keyboard input. Messages that are ignored are handled by default message processing 416. Messages generated by WSQ function 414 are then sent to other applications or windows for display. A hook 418 may be employed to intercept and modify messages received in windows system queue 410 prior to processing by message loop 412 or WSQ function 414. Applications 400 and 402 each include a message processing system (not shown). More information on message flow processing may be found in Conger, *Windows API Bible, The Definitive Programmer's Reference*, Waite Group Press, Corte Madera, Calif. (1992).

Hook 418 allows a module in the form of a running program or a dynamic link library (DLL) to intercept message going to other applications. These message can be acted on, modified, or even stopped through hook 418. For example, a typical use for a hook function is to remap the keyboard. Every keyboard message could be intercepted and then modified to reflect a different keyboard layout. Other uses include modifying the behavior of specific applications. For example, a hook function may used to intercept size and move messages for a program, forcing the program to be always located at one spot and one size on the screen. For example, in the case that an error message occurs and corrective action can be taken without requiring a message to be shown to a user, the original error message may be displayed in an area off the viewable portion of the screen on the display device according to the present invention. Additionally, messages may be reformatted and modified by the hook function according to the present invention.

Additionally, although the depicted example shows only one hook, a number of hooks may be placed in series to allow a series of modifications to various messages to be carried out at any one time. According to the present invention, hook 418 is employed to intercept error messages placed in windows system queue 410. For example, if application 402 is an e-mail application and sends an error message to windows system queue 410, normally that error message is displayed in a cryptic form as illustrated in window 300 in FIG. 3A. According to the present invention, hook 418 intercepts that message and modifies it such that a message such as that in window 304 or 306 is displayed to the user in window 408.

Figure 5:
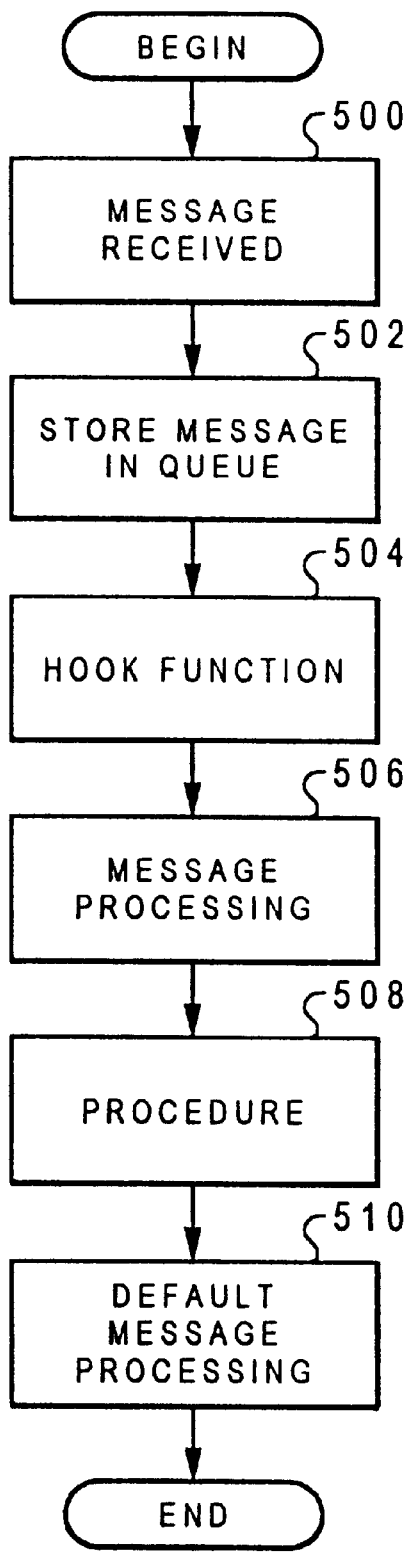
FIG. 5 is a windows message flow diagram according to the present invention.

With reference now to FIG. 5, a windows message flow diagram is depicted according to the present invention. A message is received (step 500) with that message being stored in the queue (step 502). Thereafter, a hook function may occur (step 504). The hook function intercepts message based on the criteria set up within the hook function. In the depicted example, the hook function is employed to intercept error messages. According to the present invention, the hook function takes the error messages and an analysis is made as to whether the message that will be displayed to the user is useful. If it is not useful, the hook function either reformats the message into a useful message or cancels the display of that error message. Additionally, the hook function also determines whether corrective action is necessary and automatically takes the necessary corrective action in the event that the hook function determines that corrective action is required. Furthermore, the hook function will generate the necessary response to the application originating the error message. For example, if typically the application sends an error message that results in a message being displayed along with an OK button in a window, the hook function will send the appropriate response to the application indicating that the OK button has been depressed.

Thereafter, message processing occurs (step 506). In this portion of the data flow, the message is retrieved from the queue, translated, and then dispatched. Next, the dispatched message is received by the window procedure function (step 508). The window procedure function contains the logic for processing the message and providing the appropriate response. Thereafter, default message processing occurs (step 510). Default message processing is employed to handle any messages not processed by the windows processing function.

Figure 6:
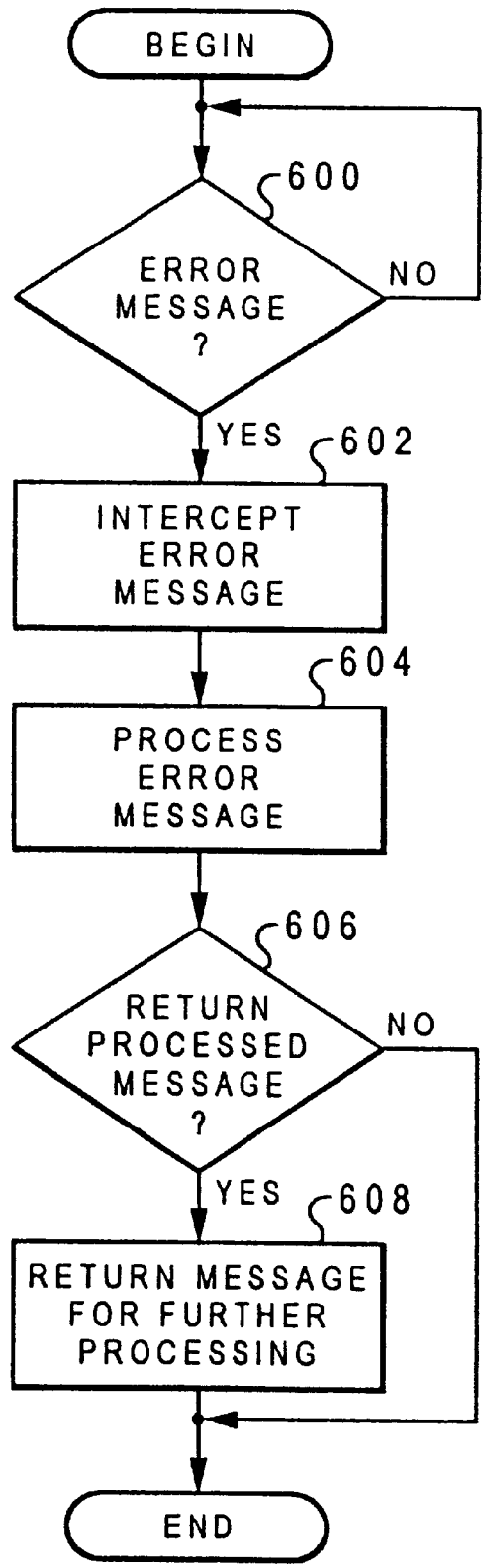
FIG. 6 is a flowchart of a process used in a hook function to handle error messages; according to the present invention.

With reference now to FIG. 6, a flowchart of a process used in a hook function to handle error message is depicted according to the present invention. The process begins be determining whether the next message in the windows system queue is an error message (step 600). If the message is not an error message, the process returns to step 600. If the message is an error message, the process intercepts and obtains the message from the windows system queue (step 602). The error message is then processed (step 604). A determination is then made as to whether the processed message is to be returned for processing by the WSQ function (step 606). If a message for processing by the WSQ function is not present, the process then returns to step 600 as described above. Otherwise, the processed message is sent to the WSQ function (step 608) with the process then also returning to step 600.

Figure 7:
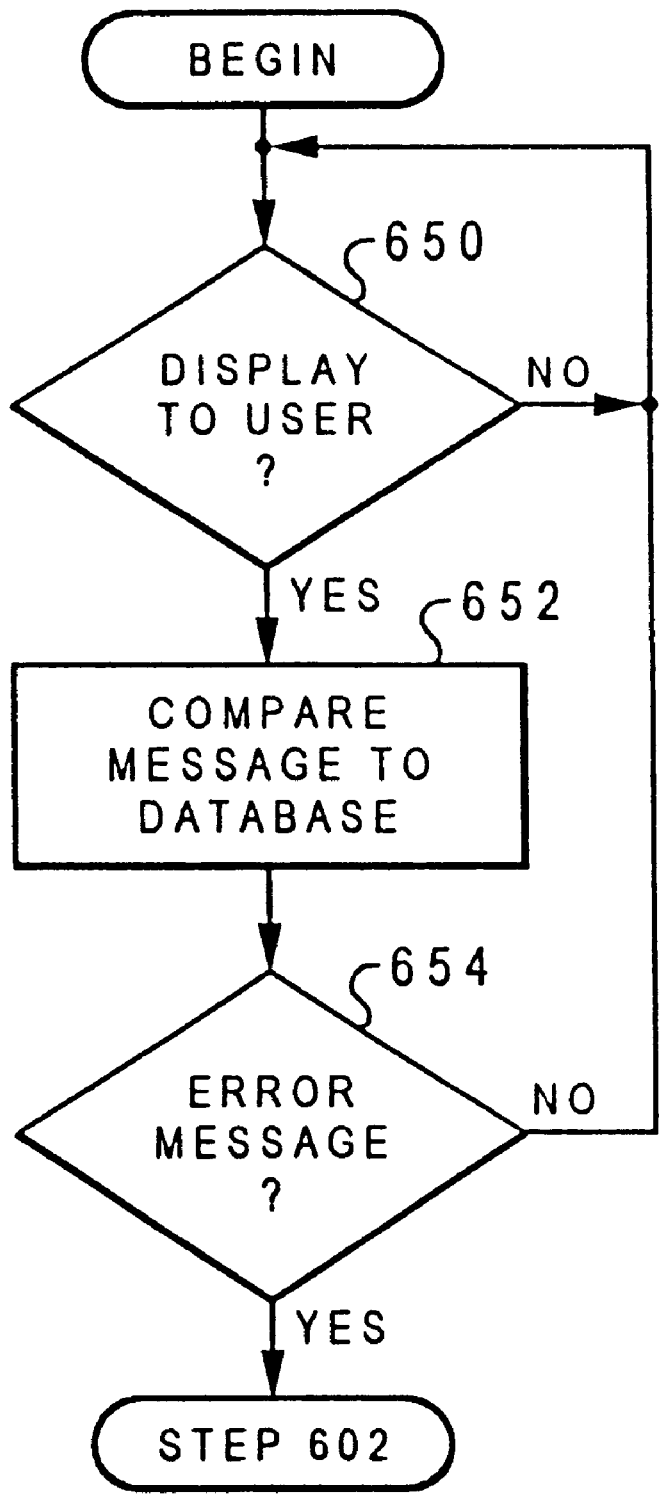
FIG. 7 is a flowchart of a process for identifying error messages according to the present invention.

Messages include parameters describing the attributes of the window to be created. With reference now to FIG. 7, a flowchart of a process for identifying error messages is illustrated according to the present invention. The process begins by examining the parameters to determine whether a message window will be displayed to the user (step 650). If the message is to be displayed, the message is compared to the database of error messages (step 652). A determination is made as to whether the message is an error message that will be handled by the process (step 654). If the message is an error message, the process then proceeds to step 602 as described above in FIG. 6. Otherwise, the process continues to return to step 650.

Figure 8:
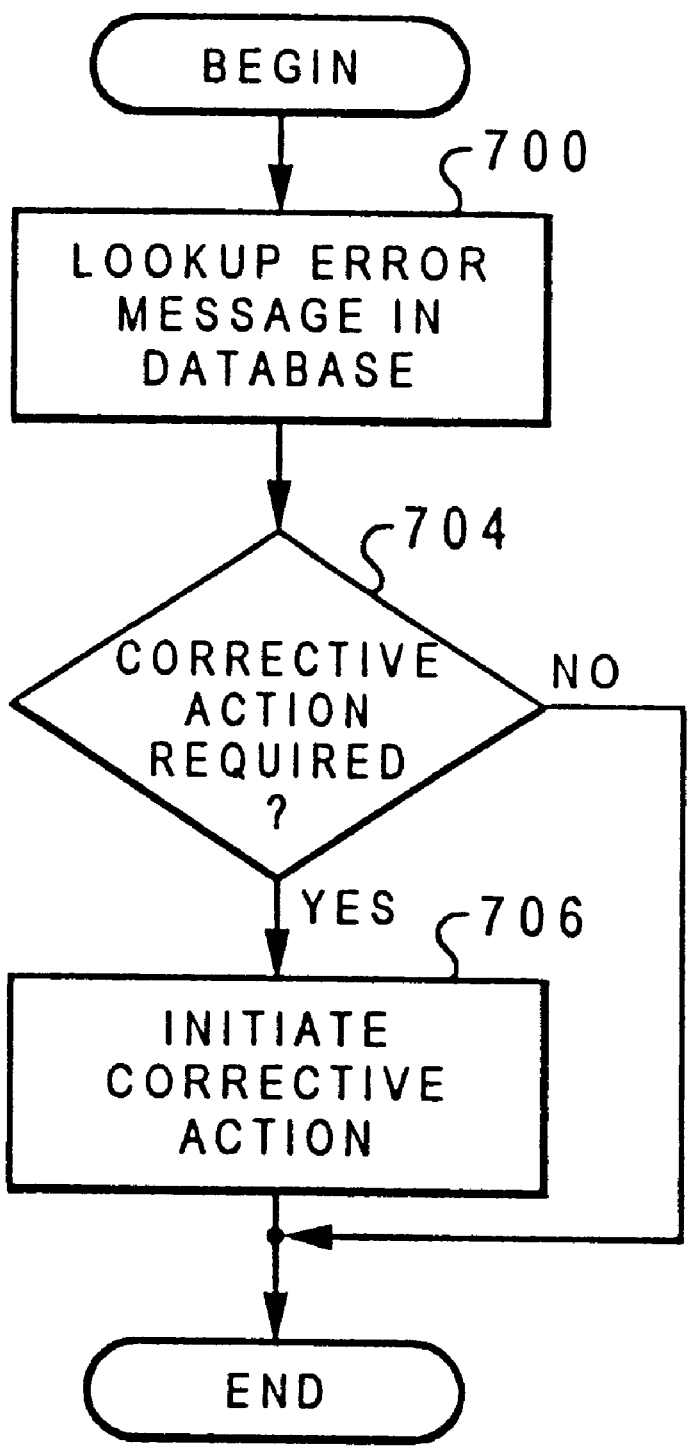
FIG. 8 is a flowchart of a process for processing error messages according to the present invention.

With reference now to FIG. 8, a flowchart of a process for processing error messages is depicted according to the present invention. The process begins by looking up the error message to a database of error messages (step 700). A determination is made as to whether corrective action is required (step 702). If corrective action is required, the process then initiates the corrective action based on the results of the comparison of the error message to the database (step 704) with the process terminating thereafter. If corrective action is not required, the process also terminates.

With reference to FIG. 9, a diagram of a database used for looking up error messages is depicted according to the present invention. Column 800 is a error message column to which the error message is compared. Column 802 indicates what reformatting of the error message is necessary to produce a new message for display to a user. Column 802 also indicates whether a new message is even required to be displayed to a user. Column 804 is a corrective action column and indicates the corrective action if any that is to be initiated. Column 805 indicates what responses are required to be returned to the application originating the error message. For example, in the case that the application is expecting the user to push an "OK" button in response to viewing the message to have the window disappear, the database will indicate that the "OK" button should be pushed. For example, in column 804 entry 806 indicates that no corrective action is required while entry 808 indicates that the windows operating system is to be restarted. Alternatively, a picture may be displayed to the user while the system is restarted. Entry 810 indicates that the data processing system is to be rebooted by disconnecting the power supply and reconnecting it. Entry 812 indicates that a communications link is to be established. Based on the corrective actions indicated in column 804, the necessary programs or procedures are initiated to take corrective action without requiring the user to initiate the actions.

With reference no to FIG. 10, a flowchart of a process for taking corrective actions is depicted according to the present invention. If the process begins by determining whether the corrective action requires restarting the windows operating system (step 900). If the determination is that the operating system should be restarted, the process then initiates the procedures needed to restart the windows operating system (step 902) with the process terminating thereafter. If the corrective action does not require restarting the windows operating system, a determination is made as to whether the corrective action requires the data processing system to be rebooted (step 904). If the data processing system should be rebooted, the process then reboots the data processing system (step 906) with the process terminating thereafter. The system also may be rebooted if the data processing system has hung up or frozen. This is initialized by controller 214 as described above. More information with respect to rebooting a data processing system using controller 214 is found in application U.S. patent application Ser. No. 08/797,076 Alternative boot record, inventor Nancy Worcham, Attorney Docket No. AT9-97-003, filed on Feb. 10, 1997, which is incorporated herein by reference.

If the process does not require the data processing system to be rebooted, then the process initializes a program for the corrective action (step 908). For example, the corrective action could require an establishment of a communications link, which would result in the hook initializing the program necessary to establish the communications link. If the corrective action does not require the initialization of a program, the process then terminates because no corrective action is required.

With reference now to FIG. 11, a process for handling error messages displayed to a user is illustrating according to the present invention. First, a determination is made as to whether the message should be ignored (step 1000). If the message is to be ignored, the process terminates. Otherwise, the process determines whether to reformat the message that is to be displayed to the user (step 1002). If the message is to be reformatted, the process then reformats the message (step 1004) and then replaces the original message with the reformatted message (step 1006) with the process terminating thereafter. With reference again to step 1002, if the message is not to be reformatted, the message to be displayed to the user is cancelled (step 1008). In this instance, a message for display to the user is not passed on to the program. Alternatively, the message may be canceled by altering the error message to display in a location on the screen not visible to the user.

Thus, the present invention provides an improved method and apparatus for handling error messages. The present invention intercepts error messages and determines whether to reformat messages for display to a user and also determines what action should be taken in view of the error message.

With reference now to FIG. 12, a flowchart of a process for returning a response to an application originating an error message is depicted according to the present invention. The process begins by determining the response required by the application (step 1100). The response required by the application is determined when the error message is looked up in the database as illustrated in FIG. 8. For example, the response may be the depression of an "OK" button that is to be normally displayed with an error message. The process then returns that response to the application (step 1102). In this manner, if as in FIG. 3C with message box 306, an "OK" button was originally required to be depressed, but is not displayed to the user, a response is still required by the application originating the error message. The application expects at some point that the "OK" button will be depressed by the user. The present invention supplies the expected response without requiring the user to make the response.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for handling error messages, related to a system error, received in a message queue in a message handling system in a graphical user interface, the method comprising the data processing system implemented in steps of:

identifying a receipt of an error message in the message queue;

intercepting the error message before processing of the error message by the message system occurs;

determining whether a corrective system action is required in response to the error message;

determining whether the error message should be reformatted;

initiating the corrective system action in response to a determination that the error message should be reformatted.

2. The method of claim 1, wherein the graphical user interface is a windows based operating system and wherein the initiating step comprises restarting the windows based operating system.

3. The method of claim 1, wherein the initiating step comprises restarting rebooting the data processing system.

4. The method of claim 1, wherein initiating step comprises intitializing a program.

5. The method of claim 1, wherein a program initiating the error message requires a preselected response and wherein the initiating step comprises sending the preselected response to the program.

6. The method of claim 5, wherein the preselected response is a depressing of a button and wherein the initiating step comprises sending a message to the program indicating that the button has been depressed.

7. The method of claim 1, wherein the reformatting step comprises replacing the error message with a new error message.

8. The method of claim 1, wherein the reformatting step comprises altering the error message such that a display of the error message in the graphical user interface is absent.

9. A data processing system for handling error messages, related to a system error, received in a message queue in a message handling system in a graphical user interface, the data processing system comprising:

identification means for identifying a receipt of an error message in the message queue;

intercept means for intercepting the error message before processing of the error message by the message system occurs;

first determination means for determining whether a corrective system action is required in response to the error message;

second determination means for determining whether the error message should be reformatted;

initiation means for initiating the corrective system action in response to a determination that the error message should be reformatted.

10. The data processing system of claim 9, wherein the graphical user interface is a windows based operating system and wherein the initiation means comprises means for restarting the windows based operating system.

11. The data processing system of claim 9, wherein initiation means comprises means for restarting rebooting the data processing system.

12. The data processing system of claim 9, wherein initiation means comprises means for intitializing a program.

13. The data processing system of claim 9, wherein a program initiating the error message requires a preselected response and wherein the initiation means comprises means for sending the preselected response to the program.

14. The data processing system of claim 13, wherein the preselected response is a depressing of a button and wherein the initiating means comprises means for sending a message to the program indicating that the button has been depressed.

15. The data processing system of claim 9, wherein the reformatting means comprises means for replacing the error message with a new error message.

16. The data processing system of claim 9, wherein the reformatting means comprises means for altering the error message such that a display of the error message in the graphical user interface is absent.

17. A method in a data processing system for system for handling error messages related to a system error, received in a message queue in a message handling system in a graphical user interface, the method comprising the data processing system implemented in steps of:

identifying a receipt of an error message in the message queue;

hooking the error message before processing of the error message by the message system occurs;

determining whether a corrective system action is required in response to the error message;

determining whether the error message should be reformatted;

initiating the corrective system action in response to a determination that the corrective action is required;

reformatting the message in response to a determination that the error message should be reformatted.

18. A computer program product for use with a data processing system for system for handling error messages, related to a system error, received in a message queue in a message handling system in a graphical user interface, the computer product comprising:

a computer usable medium;

first instructions for identifying a receipt of an error message queue;

second instructions for intercepting the error message before processing of the error message by the message system occurs;

third instructions for determining whether a corrective system action is required in response to the error message;

forth instructions for determining whether the error message should be reformatted;

fifth instructions for initiating the corrective system action in response to a determination that the corrective action is required;

sixth instructions for reformatting the message in response to a determination that the error message should be reformatted, wherein the instructions are embodied within the computer usable medium.

19. The computer program product of claim 18, wherein the computer useable medium is a hard disk drive.

20. The computer program product of claim 18, wherein the computer useable medium is a floppy disk.

21. The computer program product of claim 18, wherein the computer useable medium is a digital communications link.

* * * * *